(12) United States Patent
Didriksen et al.

(10) Patent No.: US 6,728,597 B2
(45) Date of Patent: Apr. 27, 2004

(54) STORAGE SYSTEM FOR STORING ITEMS TO BE DISTRIBUTED

(75) Inventors: Jan Didriksen, Lystrup (DK); David Simon, Highland Park, NJ (US)

(73) Assignee: Crisplant A/S, Århus N (DK)

( * ) Notice: Subject to any disclaimer, the term of this patent is extended or adjusted under 35 U.S.C. 154(b) by 0 days.

(21) Appl. No.: 10/186,422

(22) Filed: Jul. 2, 2002

(65) Prior Publication Data

US 2003/0065421 A1 Apr. 3, 2003

Related U.S. Application Data (60) Provisional application No. 60/301,824, filed on Jul. 2, 2001.

(51) Int. Cl.[7] .............................................. G06F 17/00
(52) U.S. Cl. ...................... 700/243; 700/242; 700/214; 700/225; 414/270; 414/273; 414/331.04
(58) Field of Search ................................ 700/213, 241, 700/242, 243, 225, 214; 414/270, 273, 331.04, 331.15; 312/266, 267, 268

(56) References Cited

U.S. PATENT DOCUMENTS

| | | | |
|---|---|---|---|
| 5,183,142 A | 2/1993 | Latchinian et al. | |
| 5,207,335 A | 5/1993 | Voelz | |
| 5,473,545 A | 12/1995 | Schausten | |
| 5,568,393 A | * 10/1996 | Ando et al. | 700/214 |
| 5,785,482 A | * 7/1998 | Tanaka | 414/270 |
| 6,026,375 A | 2/2000 | Hall et al. | |

FOREIGN PATENT DOCUMENTS

| | | |
|---|---|---|
| DE | 197 04 210 A1 | 8/1998 |
| WO | WO 94/07776 | 4/1994 |
| WO | WO 01/31593 A1 | 5/2001 |

\* cited by examiner

*Primary Examiner*—Khoi H Tran
(74) *Attorney, Agent, or Firm*—Birch, Stewart, Kolasch & Birch, LLP (57) ABSTRACT

A storage system for receiving, delivering and storing items, e.g. mail items, to be distributed. Items are stored in a flexible manner allowing sufficient space to be allocated to each item while ensuring that the total available space is utilised in an optimal manner. Items may be carried on trays. The size of the items is determined in order to allocate the correct amount of space. Items may be repositioned during non-operational periods in order to reduce time consumed during delivery of items from the system. Further, methods for receiving and delivering items to/from the system. A payment system is provided.

27 Claims, 5 Drawing Sheets

STORAGE SYSTEM FOR STORING ITEMS TO BE DISTRIBUTED

This application claims the benefit of Provisional application No. 60/301,824 filed Jul. 2, 2001.

FIELD OF THE INVENTION

The present invention relates to a storage system for storing and preferably delivering and/or receiving items to be distributed, such as mail items. The present invention further relates to methods for receiving and delivering items to/from the system, and to a method for optimising the time used during a delivery procedure. In particular, the present invention relates to a storage system in which the space available may be utilised in an optimal manner.

BACKGROUND OF THE INVENTION

Systems for automatic check-in of postal items are known, e.g. from WO 00/08612 or from WO 92/17861. These references are mainly concerned with the check-in procedure, and, thus, do not address the problem of storing the items in a suitable manner. Also, they are not concerned with delivering items to customers.

WO 94/07776 and U.S. Pat. No. 5,473,545 disclose various storage systems in which the space allocated to an item is dependent from the size of the item.

SUMMARY OF THE INVENTION

It is an object of preferred embodiments of the present invention to provide a storage system being capable of receiving and delivering items from/to a user in an automatic manner. In the present context, the user is also referred to as "operator". It is a further object of preferred embodiments of the present invention to provide a storage system in which items may be stored in such a way that the space available is utilised in an optimal manner while ensuring that sufficient space is allocated to each item.

It is an even further object of preferred embodiments of the present invention to provide a storage system which provides the possibility of positioning the items to be stored in a flexible manner.

It is an even further object of preferred embodiments of the present invention to provide a method for receiving an item at a storage system and positioning the item in the storage system in such a way that the space available in the storage system is utilised in an optimal manner, while ensuring that sufficient space is allocated to the item.

It is an even further object of preferred embodiments of the present invention to provide a method for delivering an item from a storage system.

It is an even further object of preferred embodiments of the present invention to provide a method of optimising the time used when delivering items from a storage system.

According to a first aspect of the invention there is provided a storage system for storing items to be distributed, the storage system comprising a platform for supporting items, a storage arrangement for storing items to be distributed, a sensor system for determining the size of an item being received and for producing a corresponding output, a control system, also referred to as control means, for controlling the operation of the storage system, and a transport system for moving an item between the platform and the storage arrangement, wherein the control system is adapted to allocate a position in the storage arrangement for an item being received based on the output produced by the sensor system, in such a way that sufficient space is allocated to the item, and wherein the transport system is operated in accordance with said allocation, so that the item is moved to the allocated position.

The storage arrangement may comprise a carousel of racks being suitable for accommodating the items.

A payment unit for receiving payment from an operator of the storage system may be provided, whereby the payment unit may be operatively connected to the control system, the control system being adapted to process an item in response to a predetermined signal from the payment unit. The predetermined signal which may be generated in the payment unit may for example comprise information indicating that an item may be released and delivered to the operator. The signal may alternatively comprise information indicating that appropriate postage for an item, such as a postal package, has been paid.

The system may be used for receiving, delivering and/or storing items to be distributed. Thus, the platform may be for receiving/delivering items. The storage arrangement is preferably flexible in the sense that items may be rearranged within the storage system, so that an item may be moved from an initial first position in the storage system to a second position. The sensor system preferably comprises means for determining the size of an item being received and for producing a corresponding output. The transport system preferably comprises means for moving an item between the receiving/delivery platform and the storage arrangement. The control means is preferably adapted to allocate a position in the storage arrangement for an item being received based on the output produced by the determining means, in such a way that sufficient space is allocated to the item, and in such a way that the total space available in the storage arrangement is utilised in an optimal manner in the sense that the waste space above, under or next to the item in question is minimized.

In the present context, the size of the item may for example be a height, a width or a volume which may be detected by appropriate optical or other means. In preferred embodiments, the size is a height of an item.

The receiving/delivery platform is preferably a substantially horizontal platform being suitable for carrying an item being received or delivered. It may be provided with a movable front panel, such as a door or a hatch, in order to prevent persons from gaining access to the system when items are not being received and/or delivered to/from the system. The receiving/delivery system may also be provided with a weighing device for weighing an item being received by the system, e.g. in order to determine the amount of postage needed for the item, in case the item is a mail item, such as a parcel or a letter. Furthermore, the receiving/delivery platform may comprise moving means for moving an item after it has been received from or before it is delivered to a user. Such moving means may, thus, be used for positioning an item to be delivered on the platform, and/or it may be used for removing an item which has been received away from the platform for further processing.

The items to be distributed are preferably mail items, such as parcels and/or letters. Alternatively or additionally, they may be any kind of goods being distributed, e.g. remote purchases, such as mail order, items purchased via the Internet, e.g. books, clothes, video films, tickets for, e.g. theatres, sport events or concerts, etc., and/or it may be return goods which need to be returned to the originator, e.g.

library books to be returned to the library, leased video films to be returned to the retailer, items being returned to the vendor for service and/or repair, etc.

The storage arrangement is an arrangement which is suitable for storing the items from they are received by the system from one user until they are delivered to another user. The storage arrangement should be designed in such a way that each item being stored may be allocated sufficient space. On the other hand, the total space available should be utilised in an optimal manner. Hence, the storage arrangement is flexible in the sense that for each item the allocated space is sufficient, but not excessive. Thus, a small item is allocated a small amount of space, and a larger item is allocated a larger amount of space. The available positions of the flexible storage system should not be predefined. Thereby it is always ensured that the correct amount of space may be allocated regardless of the size of the item being received.

The storage arrangement may comprise a carousel of racks being suitable for accommodating the items. In this case the means for moving an item between the receiving/delivery platform and the storage arrangement may comprise means for turning the carousel. Thus, when an item is received, the carousel may be turned in such a way that the section comprising the allocated position is placed near the receiving/delivery platform in order to facilitate, or even make possible, the transfer of the item from the receiving/delivery platform to the storage arrangement. Similarly, when an item is delivered, the carousel may be turned in such a way that the section comprising the item is placed near the receiving/delivery platform in order to facilitate, or even make possible, the transfer of the item from the storage arrangement to the receiving/delivery platform.

The output produced by the determining means may be an electrical output, an electronic output, an infrared output and/or any other suitable kind of output.

The control means may comprise computing means, such as a central processing unit (CPU), memory means, such as random access memory (RAM), a hard disc, etc. Alternatively or additionally, it may comprise any other suitable kind of control means.

The means for moving an item between the receiving/delivery platform and the storage arrangement may comprise conveying means, such as one or more endless belt conveyors, one or more gravity conveyors, e.g. chutes, one or more elevator means, one or more conveyors comprising a plurality of conveying carts, etc. Alternatively or additionally, the moving means may comprise means for grapping an item and moving it from one destination to another. Such a grapping and moving meals may, e.g., be an intelligent or semi-intelligent robot being capable of moving an item according to instructions, e.g. contained in a machine readable code attached to the item or given to the robot by the control means via a communication means, e.g. comprising a wire or means for wireless communication, e.g. an infrared link or a radio frequency link, etc.

Preferably, the system further comprises a plurality of movable positioning members being adapted to carry an item being moved between the receiving/delivery platform and the storage arrangement, each movable positioning member further being adapted to be positioned at an allocated position.

In this embodiment each item in the system is carried by a movable positioning member, at least when being moved between the receiving/delivery platform and the storage arrangement. Preferably, the items remain on their respective movable positioning member during storage. In this case the movable positioning members preferably constitute boundaries between the allocated positions for different items. Thus, a movable positioning member carrying an item which has just been received may be positioned adjacent to another movable positioning member carrying another item which has previously been positioned in the storage arrangement, in such a way that there is sufficient, but not excessive, space for both items.

The storage arrangement may comprise a plurality of holding members being adapted to hold a movable positioning member. Thereby, a movable positioning member carrying an item may be positioned at the position which has been allocated to the item. The holding members may comprise one or more gripping means for gripping and fixing a movable positioning member. Alternatively or additionally, they may comprise one or more supporting surfaces being adapted to support a movable positioning member, so that a movable positioning member may rest on said supporting surface(s) when the force of gravity acts on the movable positioning member and the item being carried. This is similar to the system applied in ovens or the kind of 'tray racks' known from cafeterias etc. In this case a baking tray (in the oven example) or a tray (in the 'tray rack' example) may be positioned in a number of different positions. However, a suitable position must be chosen. For example, if the 'tray rack' contains a tray with a bottle in an upright position, the next tray can not be positioned immediately above this tray. Rather, the next tray must be positioned a couple of positions further upwards in order to accommodate sufficient space for the bottle.

The storage arrangement may comprise a number of frames having a width corresponding to the width of a movable positioning member, in which case the holding members are arranged at least substantially equidistantly in a substantially horizontal direction in the frames. Thus, the movable positioning members may be positioned in the storage arrangement like baking trays in an oven or trays in a cafeteria as described above.

The receiving/delivery platform may be adapted to accommodate one or more movable positioning member(s), so that an item being processed, for example received/delivered, may be positioned directly on a movable positioning member.

In this embodiment a user having an item to be received by the system positions the item directly on a movable positioning member. When the receiving procedure has been concluded the item, as well as the movable positioning member accommodating the item, are moved from the receiving/delivery platform to the storage arrangement where the item is stored, preferably along with the movable storage member accommodating it, until the item is to be delivered to a different user. Then the item and the movable positioning member are moved to the receiving/delivery platform, and the user may pick up the item directly from the movable positioning member.

Alternatively, a received item may be moved onto a movable positioning member after the receiving procedure has been concluded, and subsequently moved along with the movable positioning member to the storage arrangement. When the item is to be delivered to a different user, the item, and the movable positioning member accommodating it, are moved from the storage arrangement to the receiving/delivery platform. The item is then moved from the movable positioning member onto the receiving/delivery platform, from where it may be picked up by the user.

Preferably, at least one of the movable positioning members is a tray, or another substantially flat member being suitable for carrying, holding and supporting an item during transport and/or storage.

The means for determining the size of an item may comprise one or more optical measuring means, such as one or more photo cell(s).

Each item entering the system may be provided with unique identification means, so that each item may be identified and/or traced. The unique identification means may comprise information relating to the item, such as destination, size, weight, origination, time of delivery, expected time of reception, maximum allowed time of storage, 'fragile', 'express', 'valuable', postage applied, distributor, etc.

The platform may be equipped with a weight sensor for determining the weight of an item delivered to the storage system or delivered by the storage system to an operator. The weight sensor may be operated to the control system and to the payment unit optionally provided, so that the weight of an item may be taken into account, e.g., when charging an operator for postage. The weight sensor may comprise any suitable system or sensor known per se, including a system of so-called weighing cells.

The unique identification means may comprise a machine readable code, such as a bar code and/or a transponder and/or any other suitable kind of machine readable code.

The system may further comprise a payment unit for receiving payment from a user using the system, such as means for receiving bank notes and/or coins, and/or a credit card reader.

The system may be adapted to receive/deliver postal items, the system in this case further comprising means for entry of data by a user and means for communicating information to a user, wherein the control means is enabled to look up delivery addresses in a database comprising valid postal delivery addresses and validate a user-provided address.

The database may be available from a local computer system, or the database may be available from a remote computer system, in which case the control system preferably communicates with the database via a computer network, such as a global computer network or a local computer network.

The system may further comprise means for notifying a user when an item is to be delivered to him/her at the system. The user may be notified by means of an electronic message, such as an SMS message, an e-mail, a voice mail message, a signal transmitted via Blue Tooth™ technology or a similar message. Alternatively or additionally, the user may be notified by a telephone call, a note delivered to the house of the user, etc. An item may be processes, such as released, when the user or operator has identified himself/herself to the control system, for example by means of a personal machine-readable identification card or by means of voice, signature or fingerprint recognition.

The system may further comprise means for rearranging the items in the storage arrangement during non-operational periods. The rearranging means may form part of the means for moving an item between the receiving/delivery platform and the storage arrangement, so that an item may be moved between two different positions of the storage arrangement in a way which is similar or identical to the way in which an item is moved between the receiving/delivery platform and the storage arrangement.

The items may be rearranged in order to optimise the space available in the storage arrangement, e.g. in case some items have been removed from the storage arrangement. In this case it may be desirable to rearrange the remaining items so as to 'pack' them more closely, thereby making a larger continuous space available for storing new items being delivered. The items may also be arranged in such a way that items which are to be delivered to the same user are positioned adjacent or near each other. When the user turns up at the system, the time used during delivery will be minimised in this case, especially if the storage arrangement is of a type comprising a carousel of racks, and the carousel needs to turn in such a way that the section comprising an item to be delivered faces the receiving/delivery platform in order to allow the item to be delivered. It may be very time consuming to turn such a carousel, and therefore a lot of time may be saved if the carousel only needs to be turned once in order to allow a large number of items to be moved from the storage arrangement to the receiving/delivery platform.

Thus, the system may further comprise means for optimising the available space of the storage arrangement during non-operational periods. The optimising means may form part of the rearranging means as described above.

The system may be positioned in a movable container, such as a conventional container, e.g. of the kind used to store and/or transport goods. In this embodiment the system may be installed in the movable container by the company supplying the system at the factory which produces the system, at a central storage place for the supplier, or in another central place which is convenient for the supplier. The container containing the installed system may then be moved to a place where the system is to be used, e.g. in the parking lot of a mall or a major supermarket, or in any other suitable place which is central and convenient to gain access to for potential customers. This has the advantage that the person installing the system does not have to leave the central installing place, thereby saving the time this person would otherwise use for travelling between different locations where systems are to be installed. Furthermore, a system may be temporarily positioned in one place, and then be repositioned in another place, and so on, thereby providing the service offered by the system to a larger group of people without the costs involved in installing separate systems in all of these places.

In a second aspect the invention relates to a storage system for storing items to be distributed, the storage system comprising     a platform for supporting items,     a storage arrangement for storing items to be distributed,     a control system for controlling the operation of the storage system, and     a transport system for moving an item between the platform and the storage arrangement,     a payment unit for receiving payment from an operator of the storage system, the payment unit being operatively connected to the control system, wherein the control system is adapted to process an item in response to a predetermined signal from the payment unit.

The system of the second aspect of the invention may comprise any feature discussed herein in connection with the first and other aspects of the invention.

According to a third aspect of the invention there is provided a method for receiving an item to be distributed in a storage system, the method comprising the steps of     receiving the item at a receiving platform of the storage system,     determining the size of the item and producing a corresponding output,     allocating a position for the item in a storage arrangement of the storage system based on said output, so as to ensure that sufficient space is allocated to the item, and so as to ensure that the total available space in the storage arrangement is utilised in an optimal manner,
moving the item from the receiving platform to the allocated position.

The storage system is preferably a storage system as described above.

The allocating step is performed in such a way that sufficient, but not excessive, space is allocated to the item. The allocating step may, thus, be performed in such a way that when a new item is received, a position adjacent to the immediately previously received item is allocated to the new item. Thus, the items are 'packed' as efficiently as possible, thereby ensuring that the total available space of the storage arrangement is utilised in an optimal manner.

The item may be carried between the receiving platform and the storage arrangement on a movable positioning member.

The storage arrangement may comprise a plurality of holding members being adapted to hold a movable positioning member, in which case the moving step comprises the step of positioning a movable positioning member carrying the item at the allocated position in such a way that the movable positioning member engages with at least one holding member corresponding to the allocated position.

The positioning step may be performed by gripping the movable positioning member. Alternatively, it may be performed by letting the movable positioning member rest on one or more upwardly facing surface(s), so that the movable positioning member is kept in the allocated position by means of the force of gravity, similar to positioning a baking tray in an oven or a tray in a tray rack in, e.g., a cafeteria, as described above.

The receiving platform may be adapted to accommodate one or more movable positioning member(s), in which case the receiving step may be performed by a user positioning the item on a movable positioning member.

The step of determining the size of an item may be performed by means of one or more optical measuring means, such as one or more photo cell(s).

The optical measuring means may be arranged in a continuous manner, so that a precise measure for at least one dimension of the item may be achieved during the step of determining the size of the item.

In this embodiment the optical measuring means may be arranged along a 'natural' dimension, such as 'height', 'width' or 'depth'. In this case a measure for the size of the item for that particular dimension is obtained.

Alternatively, optical measuring means may be arranged along two or more dimensions of the item and/or 'between' two 'natural' dimensions (e.g. 'height' and 'depth'), e.g. with a known angle to each of the dimensions, so that a measure for the size of the item for the two dimensions may be obtained.

The measuring means may comprise a number of photo cells, e.g. arranged in a photo cell barrier. The number of photo cells being blocked by an item, thus, provides a measure for the size of the item. The measuring means may, alternatively or additionally, comprise a light emitter and a position sensitive detector being adapted to detect light emitted from the light emitter. When an item blocks part of the emitted light, thus preventing it from reaching the position sensitive detector, the detected light will provide a measure for the size of the item. In this embodiment the light emitter and the position sensitive detector may be one-dimensional or two-dimensional.

The storage system may comprise a plurality of movable positioning members, the storage arrangement comprising a number of frames having a width corresponding to the width of a movable positioning member, the storage arrangement further comprising a plurality of holding members being adapted to hold a movable positioning member, said plurality of holding members being arranged at least substantially equidistantly with a fixed spacing in a substantially horizontal direction in the frames. In this case the determining step is preferably performed in such a way that the produced output indicates the number of fixed spacings needed in order to accommodate the item.

In this embodiment a storage arrangement of the 'baking tray'/'tray' type is used.

The measuring means, in this case, preferably comprises a plurality of photo cells being arranged substantially linearly, and substantially equidistantly with a distance corresponding to the distance between the holding members. The number of photo cells being blocked, thus, provides a measure for the number of equidistant spacings of the storage arrangement being needed in order to accommodate the item.

The steps of the method may be repeated so as to cause a number of items to be received. This is very useful in case a user has a number of items which need to be distributed via the system, and/or in case a user needs to collect a number of items being stored in the system. In particularly, this is useful in case the system is used by a number of different operators, such as a number of different distributors, e.g. a national postal service as well as a number of courier services, and/or a number of providers of mail order services. When a person from a certain operator arrives at a system, he or she may collect all the items which have previously been received by the system, and which are to be distributed by that specific operator. Each item is delivered by the system according to the method which will be described below. The person may then check in a number of items which are to be picked up by customers at that specific system, each item being checked in according to the method described above. Thus, all operations of the system are performed in a similar manner, regardless of whether a large or a small number of items are being handled.

The third aspect of the present invention may be combined with the first and second aspect of the present invention.

According to a fourth aspect of the invention there is provided a method for delivering an item to be distributed from a storage system, the method comprising the steps of
identifying the item to be delivered,
moving the item from a position in a storage arrangement of the storage system to a delivery platform of the storage system, and
a user collecting the item from the delivery platform.

The item may be identified by means of a unique identification code being attached to the item, e.g. contained in a machine readable code, such as a bar code or a transponder.

The item is preferably moved in same way as described above. Thus, an item is preferably moved in the same manner, regardless of whether it is being delivered or received.

The user may be a person collecting a single or a few items, e.g. a private person or a representative of a company. Alternatively, the user may be a person collecting a large number of items, e.g. a representative of an operator.

The item to be delivered may have previously been received at the delivery platform and moved to the position in the storage arrangement. Thus, the item may have been received from a private person wishing, e.g., to send a parcel using a specific distributor. In this case the user is preferably a representative of that specific distributor collecting the item for further processing and distribution. The item may, alternatively have been received from a representative of a distributor, in which case the user is preferably the final recipient of the item. In this case, the system is preferably the most convenient place for the user to collect the item.

The item may be carried between the storage arrangement and the delivery platform on a movable positioning member as described above.

The delivery platform may be adapted to accommodate one or more positioning member(s). In this case the collecting step may be performed by the user collecting the item from a movable positioning member being located at the delivery platform and carrying the item as described above.

The steps of the method may be repeated so as to cause a number of items to be delivered.

The method may further comprise the step of a user identifying himself/herself, said step being performed prior to the step of identifying the item to be delivered, e.g. by a card comprising data regarding the user in an electronic form. Such a card could, e.g., comprise a magnetic stripe or chip containing the data. The card could, e.g., be a credit card, a social security card, or another suitable kind of identification card.

Alternatively or additionally, the step of a user identifying himself/herself may comprise the user identifying himself/ herself by means of an apparatus being capable of communicating by means of electromagnetic radiation. Such an apparatus could, e.g., be a cellular telephone, a portable computer, such as a lap top computer or a palm pilot, etc. The apparatus may communicate with the system by means of wireless communication, such as by means of radio waves, infra red communication, etc. Alternatively or additionally, it may communicate by means of an electrical wire.

The fourth aspect of the present invention may be combined with the first, second and third aspects of the present invention, respectively.

According to a fifth aspect of the invention there is provided a method for optimising the time used during a delivery procedure in a storage system for receiving, delivering and storing items to be distributed, the method comprising the steps of identifying all items which are to be collected by a specific recipient, determining whether the identified items are located in the vicinity of each other, in case the items are not located in the vicinity of each other, repositioning at least some of the items, so that the items are repositioned in the vicinity of each other.

Thus, according to this method the items of the storage arrangement may be rearranged during periods where no items are being received or delivered by the system. The purpose is to make sure that items which are to be collected by the same recipient are positioned in the vicinity of each other. This is particularly advantageous when a large number of items are to be collected by the same recipient. Furthermore, if the flexible storage system is of the kind having a number of frames arranged on a carousel which needs to be turned so that the part containing an item which is to be delivered, is positioned in the vicinity of the receiving/delivery platform, a lot of time may be saved during the delivery procedure. This is due to the fact that the carousel does not need to be turned by a large amount for each item being delivered.

Each item being located in the storage system may be provided with a machine readable code, in which case the determining step may comprise reading said machine readable codes.

The repositioning step may be performed in such a way that the space available is utilised in an optimal manner. Thus, during the repositioning step the size of the items may be taken into account, so that the items are also 'packed' more closely in order to utilise the available space in an optimal manner.

Each item being located in the storage system may be positioned on a movable positioning member. In this case the repositioning step may be performed by moving the item(s) in question on the corresponding movable positioning member.

The steps of the method may be repeated, so that the items of the system are eventually grouped in the storage arrangement according to the respective users who are to collect the items.

The fifth aspect of the present invention may be combined with the first, second, third and fourth aspects of the present invention, respectively.

DETAILED DESCRIPTION OF THE DRAWINGS

Figure 1:
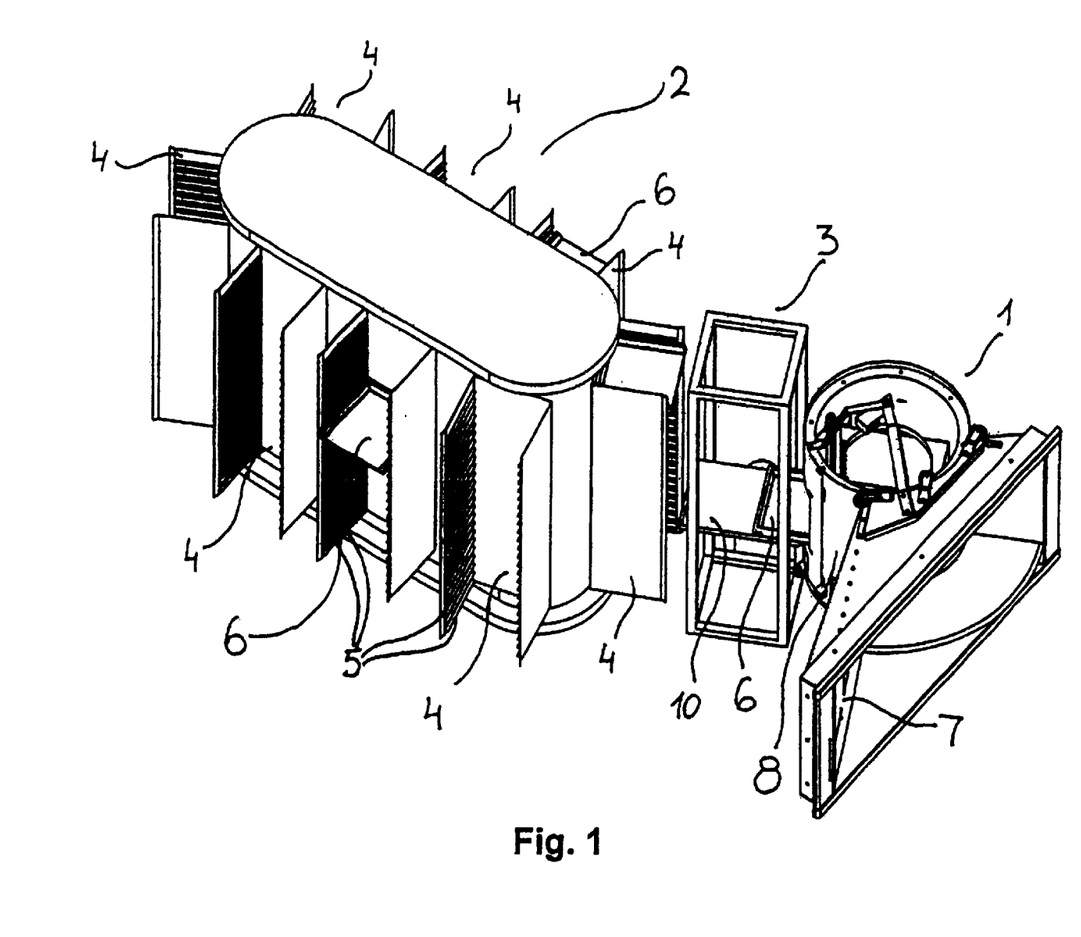
FIG. 1 is a perspective view of a storage system according to the present invention.

FIG. 1 is a perspective view of a storage system according to the present invention. The storage system comprises a receiving/delivery unit 1, a storage arrangement 2 and a connecting unit 3 for establishing a connection between the receiving/delivery unit 1 and the storage arrangement 2. The storage arrangement 2 comprises eight frames 4 arranged on a carousel, each frame 4 being provided with a plurality of holding members 5. The holding members 5 are adapted to hold a tray 6 in a specific position. The receiving/delivery unit 1 comprises a front panel 7 and a cylindrical shell part 8. Inside the cylindrical shell part 8 there is a receiving/delivery platform 9 (not visible in FIG. 1) which is adapted to accommodate a tray 6 for carrying an item.

The storage system shown in FIG. 1 is operated in the following manner. When an item is received by the system a user holding the item approaches the receiving/delivery unit 1. The user then positions the item on a tray 6 being positioned on the receiving/delivery platform 9 (not visible in FIG. 1) and optionally enters relevant data relating to the item into the system by means of communication means on the front panel 7 of the receiving/delivery unit 1. Then the size of the item is measured and a position in the storage arrangement 2 is allocated to the item in such a way that sufficient space is allocated to the item while ensuring that the total available space of the storage arrangement 2 is utilised in an optimal manner. The step of measuring the size of the item and allocating a position will be further described below.

Then the tray 6 and the item are moved to a shelf 10 of the connecting unit 3. The shelf 10 is movable in a substantially vertical direction. The level of the shelf 10 may, thus, be adapted to a certain position of a frame 4 of the storage arrangement 2. In case the allocated position is not in the frame 4 facing the connecting unit 3, the carousel of the storage arrangement 2 is turned until the relevant frame 4 faces the connecting unit 3. Then the shelf 10 is optionally moved in an upwards or downwards direction until the tray 6 comprising the item is positioned at the same level as the allocated position. The tray 6 and the item are then transferred to the allocated position.

When an item is delivered by the system, the user who is to collect the item approaches the receiving/delivery unit 1 and identifies himself/herself. The item to be delivered is then identified, and in case the frame 4 containing the item is not facing the connecting unit 3, the carousel of the storage arrangement 2 is turned until the relevant frame 4 faces the connecting unit 3. Then the shelf 10 is optionally moved in an upwards or downwards direction until it is positioned at the same level as the position of the item, and the tray 6 comprising the item is transferred from the storage arrangement 2 to the shelf 10. Then the shelf 10 is optionally moved in an upwards or downwards direction until it is positioned at the same level as the receiving/delivery platform 9 (not visible in FIG. 1), and the tray 6 and the item are transferred to the receiving/delivery platform 9 (not visible in FIG. 1) from where it is collected by the user.

Figure 2:
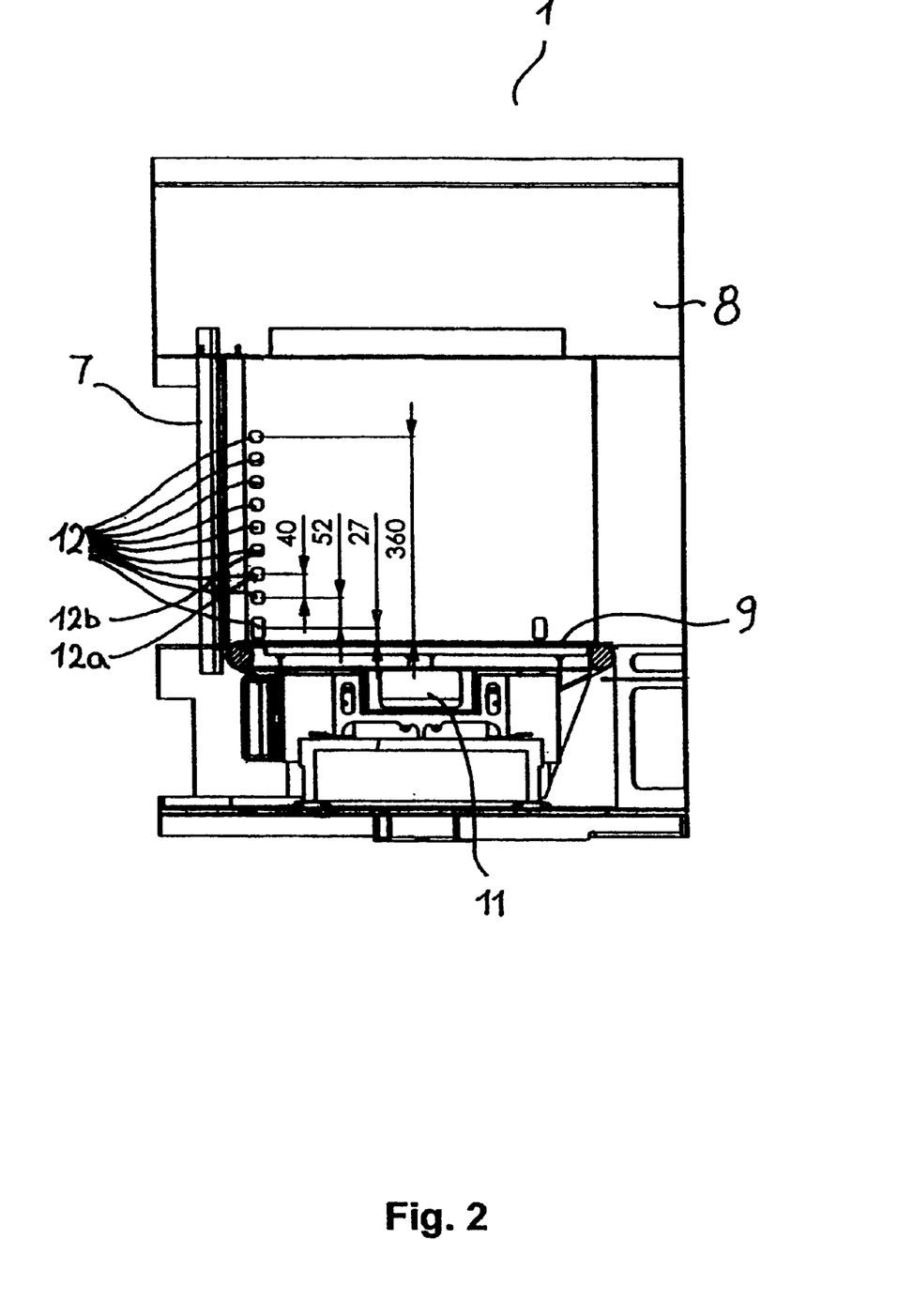
FIG. 2 is a cross section of a receiving/delivery unit of a storage system according to the present invention.

FIG. 2 shows a cross section of a cylindrical shell part 8 of a receiving/delivery unit 1 of a storage system according to the present invention. The cylindrical shell part 8 comprises a receiving/delivery platform 9 being formed as an endless belt conveyor and being adapted to accommodate a tray (not shown). The receiving/delivery platform 9 is further positioned on a weighing unit 11 so that the weight of an item being received or delivered may be determined, e.g. in order to determine the correct amount of postage needed, and/or in order to determine whether the weight of the item fulfils safety requirements of the system.

The cylindrical shell part 8 further comprises nine photo cells 12 being positioned substantially equidistantly in a substantially vertical direction. Thus, the height of an item being received by the system may be determined in the following manner. When the item is initially positioned on the receiving/delivery platform 9, it will in most cases block one or more of the photo cells 12. The number of photo cells 12 being blocked gives an indication of the height of the item. If, e.g., the three lowermost photo cells 12 are blocked, the item has a height being between the distance from the receiving/delivery platform 9 to the third photo cell 12a and the distance from the receiving/delivery platform 9 to the fourth photo cell 12b. Thus, in this embodiment a precise measure for the height of the item is not obtained. However, since the holding members of the storage arrangement are distributed discretely, it suffices to know how many slots are needed to accommodate the item. Therefore, the photo cells 12 should be positioned in such a way that the number of blocked photo cells 12 corresponds to the number of slots needed to accommodate the item. In the example described above, four slots are needed. Based upon the measurement of the height of the item, a position is allocated to the item in the storage arrangement, i.e. a position is found which has enough free slots available to accommodate the item, and, preferably, the item is further positioned adjacent a previously received item, so that the total available space of the storage arrangement is utilised in an optimal manner. The storage arrangement may be filled in such a way that a frame is filled up from the bottom up or from the top down.

In case no photo cells 12 are blocked by the item, it is determined that the item is too small to block any of the photo cells 12, and a minimum space is allocated to the item. This may, e.g., be the case if the item is a letter.

Figure 3:
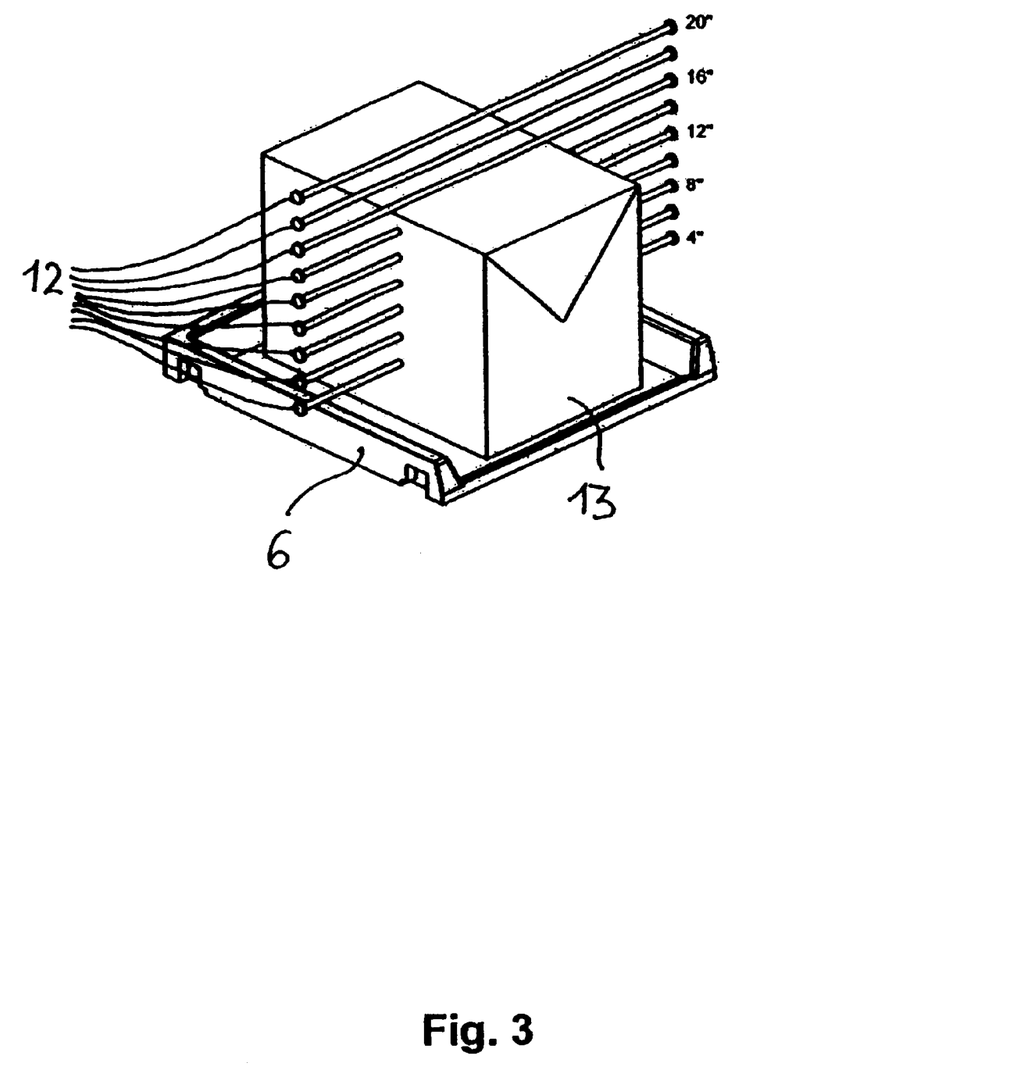
FIG. 3 illustrates the measuring of the height of an item.

FIG. 3 illustrates the measuring of the height of an item described above, the item in this case being a parcel 13. The parcel 13 is positioned on a tray 6, and it is blocking six out of nine possible photo cells 12. Thus, six slots are needed in order to accommodate the parcel 13 in the storage arrangement.

Figure 4:
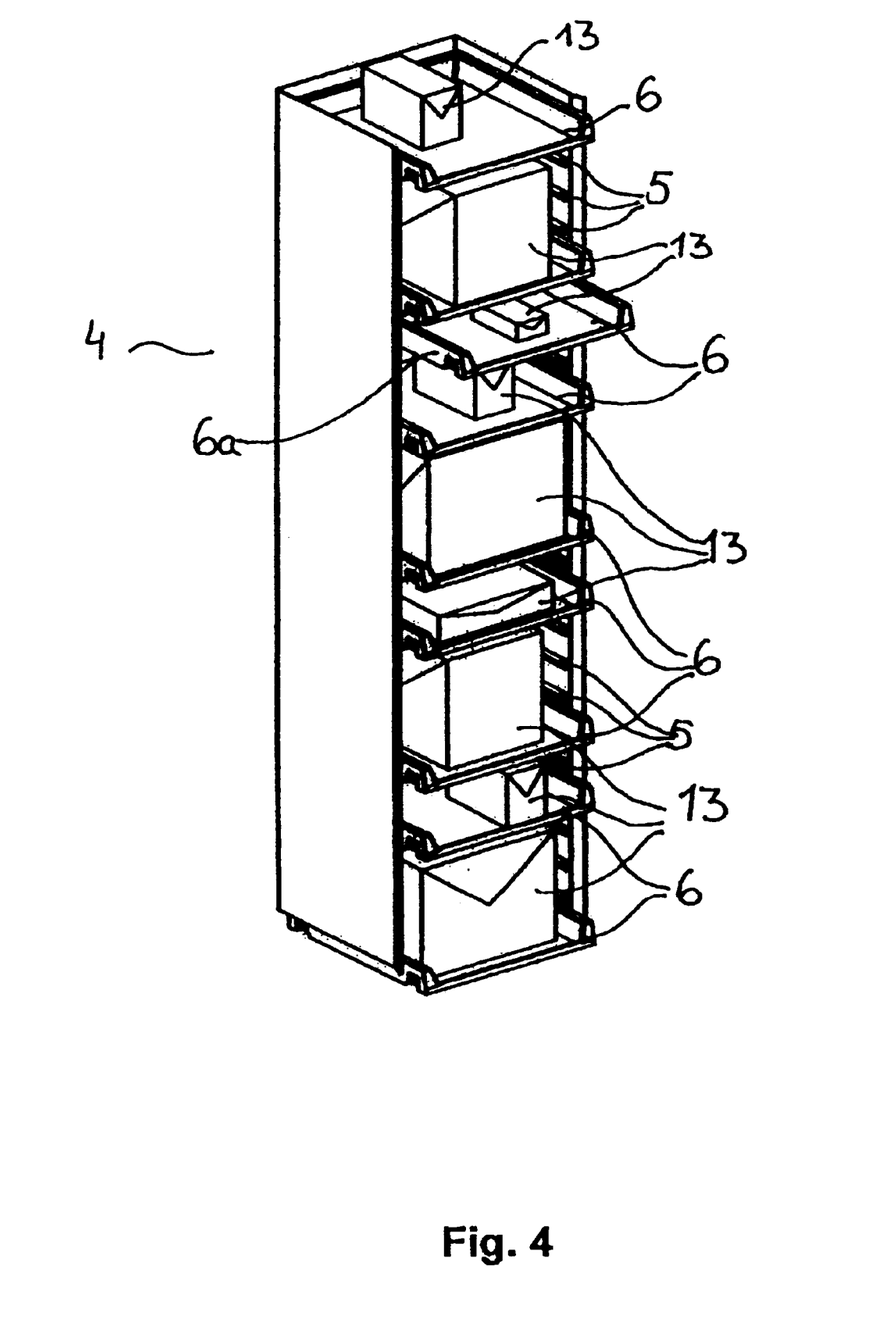
FIG. 4 shows a frame of a storage arrangement with items positioned in it.

FIG. 4 shows a frame 4 of a storage arrangement with nine parcels 13 positioned in it. Each parcel 13 is positioned on a tray 6, each tray 6 in turn being hold in a specific position by holding members 5 of the frame 4. The parcels 13 have different sizes, and it is clear from the Figure that various space is allocated to the parcels 13 according to their various sizes. Thus, only sufficient space to accommodate a parcel 13 is allocated, thus ensuring that the total available space is utilised in an optimal manner, i.e. no excessive space is allocated to any of the parcels 13. One of the trays 6a is shown partially drawn out from its position in the frame in order to indicate that the trays 6 may be moved in order to position or reposition the trays 6 carrying the parcels 13. This provides a very storage arrangement.

Figure 5:
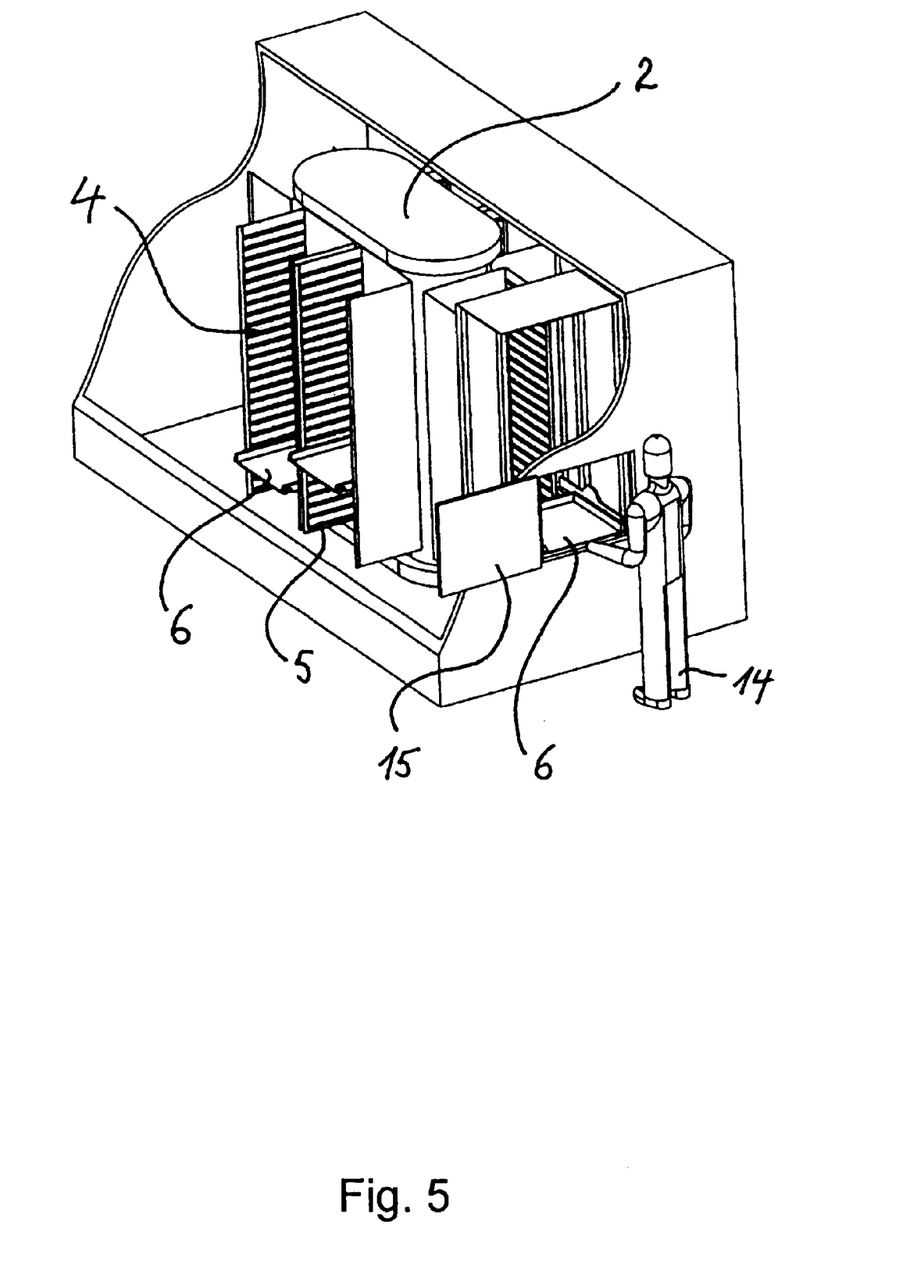
FIG. 5 shows an alternative embodiment of a storage system according to the invention.

In the embodiment of FIG. 5, the tray 6 is disposed to an operator 14 through a slidable door 15. The storage arrangement 2 comprises a carousel. Weighing cells may be comprised in the tray 6 or under the tray 6 in the delivery platform. In case one or more weighing cells are provided in the tray 6, such weighing cells may be adapted to determine the weight of an item when the tray 6 is located in the storage arrangement 2, and to communicate a signal representative of the weight from its position in the storage arrangement to the control system.

Thus, according to the present invention there is provided a storage system which is capable of receiving and delivering items from/to a user in an automatic manner has been provided. Further, the items may be stored in a flexible manner, so that the space available in the storage system is used in an optimal manner while it is ensured that sufficient space is allocated to each item. Finally, a method has been provided for optimising the time used during delivery of items from the system.

What is claimed is:

1. A storage system for storing items to be distributed, the storage system comprising a platform for supporting items, a storage arrangement for storing items to be distributed, a sensor system for determining the size of an item being received and for producing a corresponding output, a control system for controlling the operation of the storage system, and a transport system for moving an item between the platform and the storage arrangement, wherein the control system is adapted to allocate a position in the storage arrangement for an item being received based on the output produced by the sensor system, in such a way that sufficient space is allocated to the item, and wherein the transport system is operated in accordance with said allocation, so that the item is moved to the allocated position.

2. A storage system according to claim 1, wherein the storage arrangement comprises a carousel of racks being suitable for accommodating the items.

3. A storage system according to claim 1, further comprising a payment unit for receiving payment from an operator of the storage system, the payment unit being operatively connected to the control system, the control system being adapted to process an item in response to a predetermined signal from the payment unit.

4. A system according to claim 1, further comprising a plurality of movable positioning members being adapted to carry an item being moved between the platform and the storage arrangement, each movable positioning member further being adapted to be positioned at an allocated position.

5. A system according to claim 4, wherein the storage arrangement comprises a plurality of holding members being adapted to hold a movable positioning member.

6. A system according to claim 5, wherein the storage arrangement comprises a number of frames having a width corresponding to the width of a movable positioning member, and wherein the holding members are arranged at least substantially equidistantly in a substantially horizontal direction in the frames.

7. A system according to claim 4, wherein the platform is adapted to accommodate one or more movable positioning member(s), so that an item being processed may be positioned directly on a movable positioning member.

8. A system according to claim 4, wherein at least one of the movable positioning members is a tray.

9. A system according to claim 1, wherein the sensor system comprises one or more optical measuring means.

10. A system according to claim 7, wherein the sensor system comprises one or more photo cell(s).

11. A system according to claim 1, wherein each item entering the system is provided with unique identification means, so that each item may be identified and/or traced.

12. A system according to claim 11, wherein the unique identification means comprises a machine readable code.

13. A system according to claim 12, wherein the unique identification means comprises a bar code.

14. A system according to claim 12, wherein the unique identification means comprises a transponder.

15. A system according to claim 3, wherein the payment unit comprises means for receiving bank notes and/or coins.

16. A system according to claim 3, wherein the payment unit comprises a credit card reader.

17. A system according to claim 1, the system being adapted to process postal items, the system further comprising means for entry of data by a user and means for communicating information to a user, wherein the control system is enabled to look up delivery addresses in a database comprising valid postal delivery addresses and validate a user-provided address.

18. A system according to claim 1, further comprising means for notifying an operator when an item is to be delivered to the operator at the system.

19. A system according to claim 1, further comprising means for rearranging the items in the storage arrangement during non-operational periods.

20. A system according to claim 1, further comprising means for optimising the available space of the storage arrangement during non-operational periods.

21. A system according to claim 1, the system being comprised in a movable container.

22. A storage system for storing items to be distributed, the storage system comprising
a platform for supporting items,
a storage arrangement for storing items to be distributed,
a control system for controlling the operation of the storage system, and
a transport system for moving an item between the platform and the storage arrangement,
a payment unit for receiving payment from an operator of the storage system, the payment unit being operatively connected to the control system,
wherein the control system is adapted to process an item in response to a predetermined signal from the payment unit.

23. A storage system according to claim 22, wherein the storage arrangement comprises a carousel of racks being suitable for accommodating the items.

24. A system according to claim 22, the system being adapted to process postal items, the system further comprising means for entry of data by a user and means for communicating information to a user, wherein the control system is enabled to look up delivery addresses in a database comprising valid postal delivery addresses and validate a user-provided address.

25. A system according to claim 22, further comprising means for notifying an operator when an item is to be delivered to the operator at the system.

26. A system according to claim 22, further comprising means for rearranging the items in the storage arrangement during non-operational periods.

27. A system according to claim 22, further comprising means for optimising the available space of the storage arrangement during non-operational periods.

* * * * *